United States Patent Office 3,117,812
Patented Jan. 14, 1964

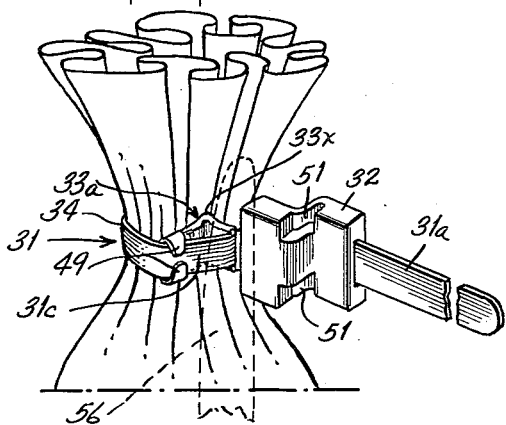
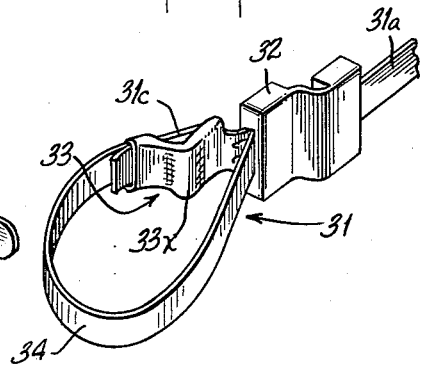
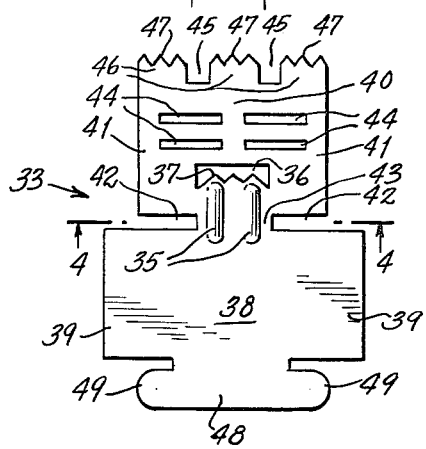
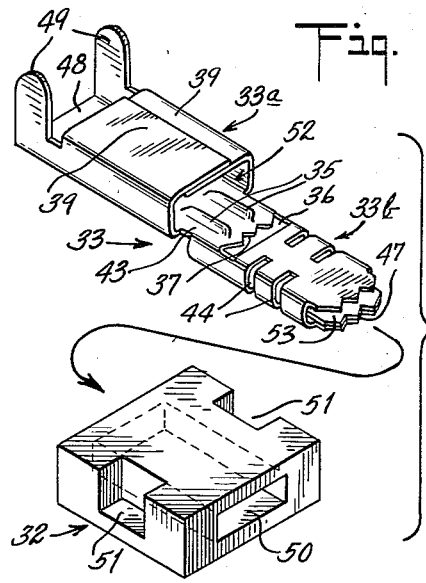
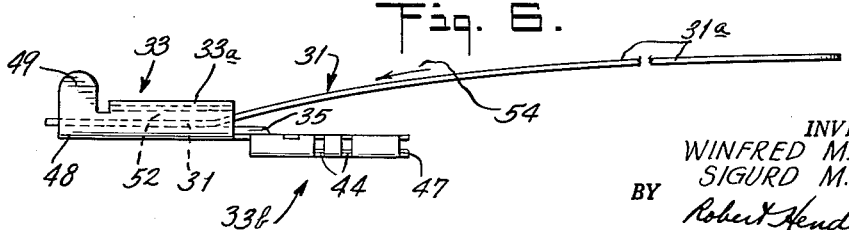
INVENTORS:
WINFRED M. BROOKS
SIGURD M. MOBERG
BY Robert Henderson
ATTORNEY

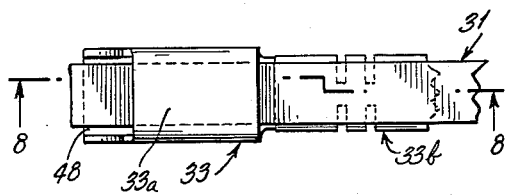
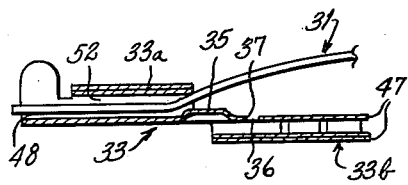
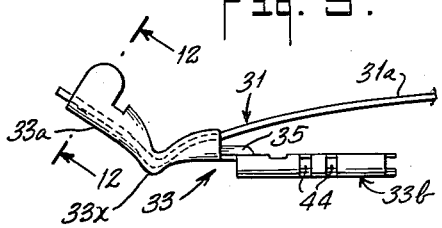
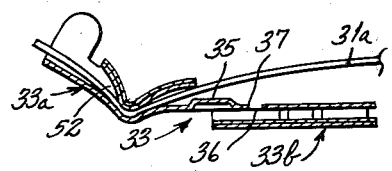
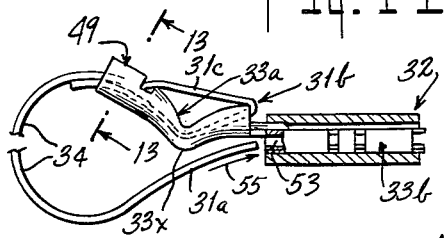
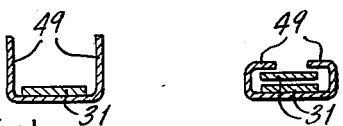
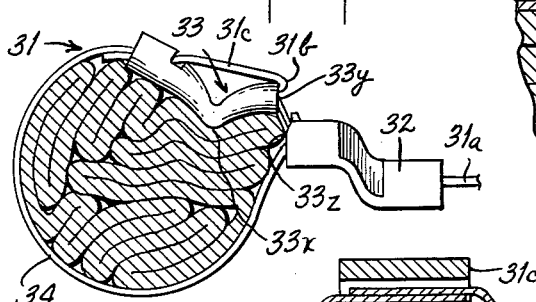
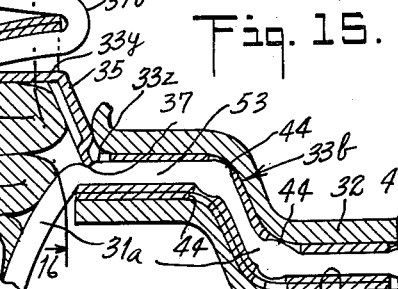
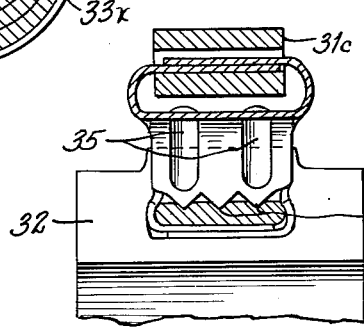
INVENTORS:
WINFRED M. BROOKS
SIGURD M. MOBERG
ATTORNEY

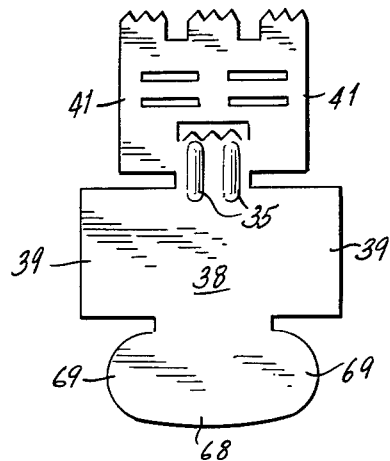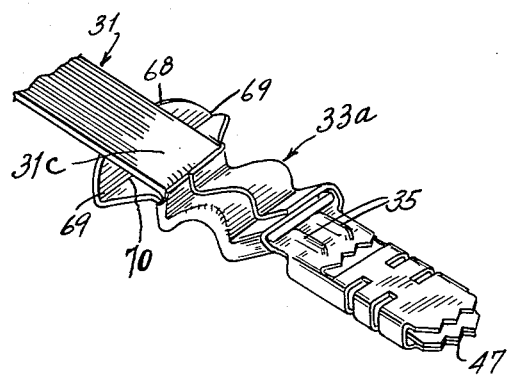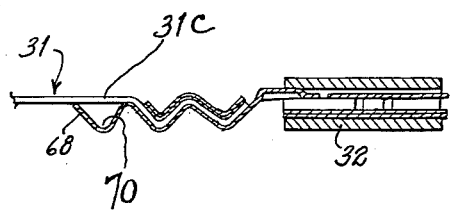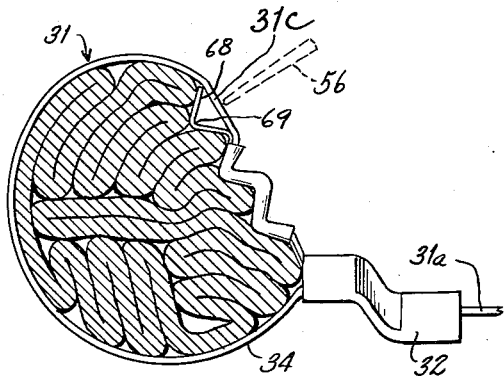

3,117,812
BAG SEAL
Winfred M. Brooks, West Orange, and Sigurd M. Moberg, Pompton Plains, N.J., assignors to E. J. Brooks Company, Newark, N.J., a corporation of New Jersey
Filed Apr. 6, 1961, Ser. No. 101,300
18 Claims. (Cl. 292—311)

This invention relates to improved bag seals providing a loop to extend about the neck of a bag, to close the latter, and means for sealing the loop tightly to prevent it from being slipped from or otherwise removed from the bag neck without breaking the loop. More particularly, this invention is directed to such seals having loops preferably of flat tape (preferably fabric) instead of cord of round cross-section as has hitherto been employed. It will be recognized, however, that some features of this invention do not depend upon the use of tape rather than cord; and that many advantages are derivable from this invention when cord is used as a time member.

Bag seals employing cord are disclosed in United States Patents Nos. 2,772,909, dated December 4, 1956, and 2,899,230, dated August 11, 1959. In the earlier of these patents, a sealing element of lead is employed and a sheet metal collar is provided as a guard between the sealing member and the bag neck. In the latter patent, a sheet metal sealing element is provided and is so shaped that a guard collar may be omitted.

The devices disclosed in the mentioned patents are effective as bag seals but leave room for improvement as seals and also do not lend themselves to most economical manufacture thereof. As to the seals as such, the mentioned sheet metal parts as well as the cord may subject the bag to an unnecessary degree of wear or damage, thereby minimizing the number of its possible reuses. As to manufacture, the several parts of the seal, e.g. the lead sealing element, the sheet metal guard collar and the cord, are assembled by the seal manufacturer by suitable threading of the cord into or through the other parts; and such threading must be done, rather slowly and uneconomically, by hand.

An important object of this invention is the provision of a bag seal which may be very economically assembled as a unitary device by mechanical means.

Another important object is the provision of a bag seal which may be easily and quickly applied to the neck of a bag.

Another important object is the provision of a bag seal having means which induce breakage of the seal if an attempt is made to open or release the seal without breaking it, thereby defeating attempts to open the bag and still have the seal available for resealing the bag.

Another important object is the provision of a bag seal in which the loop is of flat, fabric tape rather than cord.

Another important object is the provision of a bag seal which, upon application to a bag neck and while on the latter, avoids material damage or wear of the bag.

Another important object is the provision of a bag seal having a guard member underlying a portion of a fabric tape loop or functionally equivalent tie member where the latter would be cut by a knife or the like in conventional opening of a related bag, thus preventing cutting of the bag.

Those generally familiar with bag seals will undoubtedly perceive other objects and advantages of this invention upon considering the following description and the accompanying drawings wherein two preferred embodiments are disclosed, for illustrative purposes, without limiting the invention to those particular embodiments.

In the drawings:
FIGS. 1–16 illustrate a first embodiment and FIGS. 17–20 illustrate a second embodiment of this invention.

FIGURE 1 is a perspective view of a bag seal according to the first embodiment of this invention, as sealed upon a neck of a bag.

FIG. 2 is a rear perspective view of the seal, in sealed condition but with the bag omitted to show certain details more clearly.

FIG. 3 is a plan view of a substantially flat ferrule blank of sheet metal within which one end of a tape is to be gripped after the blank has been formed into a ferrule.

FIG. 4 is a sectional view of the ferrule blank on the line 4—4 of FIG. 3.

FIG. 5 is a perspective view of the blank of FIGS. 3 and 4, folded to form a ferrule, and a deformable sealing element; an arrow in this figure indicating the manner of eventual association of the ferrule and the sealing element.

FIG. 6 is a side elevational view illustrating the manner of initial association (during manufacture of the seal) of a length of fabric tape with said ferrule, the tape being shown as initially inserted into the ferrule and before being gripped therein.

FIG. 7 is a top plan view of the parts shown in FIG. 6.

FIG. 8 is a longitudinal, sectional view, substantially on the line 8—8 of FIG. 8.

FIG. 9 is a side elevational view of the same general character as FIG. 6, but with the ferrule deformed and clinched to hold the tape firmly therein.

FIG. 10 is a longitudinal, sectional view, of the same general character as FIG. 8, but showing the ferrule deformed and clinched as in FIG. 9.

FIG. 11 is a side view of the seal, partly in elevation and partly in section, complete as manufactured.

FIGS. 12 and 13, respectively, are cross-sectional views, substantially on the lines 12—12 of FIG. 9 and 13—13 of FIG. 11.

FIG. 14 is an elevational view of the seal as applied to and sealed upon a bag neck, which is shown in cross-section.

FIG. 15 is an enlarged, fragmentary, longitudinal sectional view of the principal parts which coact to hold the seal upon the bag neck.

FIG. 16 is a cross-sectional view, substantially on the line 16—16 of FIG. 15.

FIG. 17 is a plan view of a substantially flat ferrule blank, of sheet metal, such as is employed in the second embodiment of this invention.

FIG. 18 is a perspective view of the blank of FIG. 17, after having been folded into a ferrule, a tape end inserted therein, and the ferrule deformed or crimped to securely hold the tape therein.

FIG. 19 is a longitudinal, sectional view of a seal according to the second embodiment, as completely manufactured and ready for use.

FIG. 20 is an elevational view of the seal according to the second embodiment as applied upon a bag neck, which is shown in cross-section.

The seal illustrated in FIGS. 1–16 comprises three elements, namely a tie member in the form of a length of tape 31, a sealing element 32 of lead, plastic material or other suitable material, and a ferrule or clinching element 33 of sheet metal for gripping spaced portions of the tape to form a loop 34 therein. The tape, preferably should be of strong fabric as, for example, regenerated cellulose tape. The material of the sealing element should be of such properties as to be deformed and to function in the manner hereinafter explained. The metal of the clinching element should be relatively non-resilient and otherwise of such character as to enable the clinching element to function as hereinafter explained.

The sheet metal ferrule or clinching element 33 is shown in FIG. 3 as a substantially flat blank, shaped as illustrated to provide parallel ribs 35, a generally rectangular transverse opening 36, one side of which is defined by teeth 37 adjacent to corresponding ends of said ribs, a first tape-gripping portion 38 having side wings 39, and a second tape-gripping portion 40 having side wings 41, the wings 39 and 41 at opposite sides of the blank being separated by peripheral recesses 42 to provide a neck 43 in the vicinity of the ribs 35.

The second gripping portion 40 is formed with transverse cut-outs 44, and the free end of the portion 40 is formed with peripheral recesses 45, separating said free end into three tongues 46 each of which are formed with teeth 47 at their ends. An integral tab 48 extends from the first gripping portion 38 and is provided with side ears 49.

The sealing element 32, preferably in the form of a flattened cube, is formed with a passage 50 therein, of rectangular shape in cross-section, opening at opposite ends of said element. Optionally, the element 32 may be formed with side recesses 51, to facilitate sealing deformation of said element as hereinafter explained.

In manufacturing the device, the blank illustrated in FIG. 3 is folded to the form of a ferrule as shown in FIG. 5; the wings 39 being folded upwardly, then inwardly in overlapping interrelationship to form a first tape-receiving passage 52, the sides of tab 48, particularly the tab's ears 49 being folded upwardly, and the wings 41 being folded downwardly, then inwardly in overlapping interrelationship to form a second tape-receiving passage 53. For convenience, the parts defining the passage 52 are sometimes hereinafter referred to as the "assembling clinching portion" 33a and the parts defining the passage 53 are sometimes hereinafter referred to as the "sealing clinching portion" 33b.

After formation of the ferrule as shown in FIG. 5, one end of the tape 31 is inserted into the recess 52, as shown in FIG. 6, in the direction of the directional arrow 54, to the extent that the inserted end of the tape reaches or protrudes from the outer end of said recess. Then, with suitable dies, the assembling clinching portion is deformed as in FIGS. 9 and 10 to clinch the tape firmly within the recess 52. Thereafter, the free portion of the tape is swung leftwardly from its FIG. 10 to its FIG. 11 position in which it extends between ears 49 which are then folded inwardly as in FIG. 13 to hold the tape thereunder in its condition as shown in FIG. 11.

After the one end of the tape has been attached to the ferrule or clinching element 33 in the manner just described, the sealing clinching portion 33b thereof is pushed into passage 50 in the sealing element 32. The relative dimensions of the surfaces defining the passage 50 and the exterior of the sealing clinching portion 33b are preferably, such that the latter will be firmly held frictionally within the element 32 without materially closing the passage 53. With the device in its just-described condition (i.e., as in FIG. 11), it is complete and in condition for delivery by the manufacturer to the user. It will be apparent, of course, that the sealing element 32 need not necessarily be applied to the ferrule by the manufacturers but may be applied thereto by the user. However, such assembly by the manufacturers is generally to be preferred.

In understanding the manner in which the described bag seal is used, it may first be assumed that the seal has been completely assembled as in FIG. 11. The user first extends the loop portions 34 of the tape about the neck of the bag with apex 33x of the clinched portion 33a facing the bag neck, as shown in FIG. 1, and pushes the free end 31a of the tape rightwardly (as indicated by directional arrow 55), into and through the passage 53 as viewed in FIG. 11; the just-described disposition of the tape being further illustrated in FIGS. 2, 14 and 15.

Then, by manually pulling upon the free end of the tape, the loop 34 is preliminary tightened upon the neck of the bag after which a conventional plier-like sealing tool is applied to the sealing element 32 and to the protruding free end of the tape and is operated, first to pull said free tape end to complete the tightening of the tape and then to deform the sealing element 32 and the within portion 33b of the sheet metal ferrule firmly to clinch the latter portion of the ferrule within said sealing element and the tape within the sealing clinching portion 33b of the ferrule. The mentioned sealing tool has a manually operable cord gripping and tightening portion which, with the present device, grips and tightens the tape, and a sealing portion which, while the tape is firmly held in its tightened condition, compresses and deforms the sealing element 32, the within portion 33b of the ferrule and the within tape to their relative clinched conditions substantially as illustrated in FIGS. 1, 2, 14 and 15. This deformation of the element 32 not only gives the ferrule portion the indicated wavy or undulant condition but also causes the tape to be squeezed tightly within the ferrule.

It may be seen from FIG. 11 that one end of the tape 31 is held firmly against being pulled endwisely from the ferrule, first, by being clinched firmly in the latter's portion 33a and, second, by reason of the reverse bend of the tape at 31b which avoids any direct pull on the portion of the tape clinched within portion 33a.

At the other end of the tape, the deformation of the sealing element 32 renders it impossible for the sealing clinching portion 33b of the ferrule to be pulled out of said sealing element. Likewise, the resulting deformation and compression of the ferrule portion 33b prevents pulling out of the tape. Additionally, the cut-outs 44 in the ferrule permit the tape to bulge into them to some extent, as may be seen from FIG. 15; and the teeth 47 and 37 also become partially imbedded into and grip the tape firmly as shown in both FIGS. 15 and 16; all to the purpose of assuring against withdrawal of the tape.

It will have been observed that, in assembling one end of the tape into and clinching it into the ferrule portion 33a, the latter is given the shape of a V, the open part of which faces outwardly or away from the bag neck when the device is sealed thereon as shown in FIG. 1; and that a tape portion 31c extends across said open part. That arrangement facilitates opening of the seal and the bag by enabling a knife 56 to cut through the tape very easily, whereafter the tape, held only loosely underneath the ears 49 (see FIG. 13), falls away from the bag neck.

It should be noted from FIGS. 14 and 15 that when, as already explained, the mentioned sealing tool tightens the tape about the bag neck and then deforms and clinches the element 32, the ferrule 33 bends transversely at two relatively weak points, point 33y which is substantially coincident with neck 43 and point 33z which is substantially coincident with opening 36. The ribs 35 serve to oppose bending of the ferrule between points 33y and 33z. This bending enables the bag neck to be firmly engaged by the ferrule and tape without any sharp angular engagement therewith at the adjacent end of the sealing element 32 and also swings the teeth 37 into firm embedded engagement with the tape as already explained.

The appearance of the sealing element 32, in its deformed condition, is illustrated in the drawings as it would appear if formed of lead or other deformable material which, like lead, tends to retain any shape to which it has been deformed.

If the sealing element 32 is formed, as suggested, of certain plastic materials, as, for example, polyethylene, said element, after being deformed upon sealing of the device in the manner described, has a tendency to depart somewhat from its deformed shape and to return to its original shape. However, the portion 33b of the clinching element, holds the shape to which it has been deformed and, consequently, holds the sealing element 32 very closely to the deformed shape of that element as illustrated in the drawings. The arrangement is such that the sealing element 32 and the clinching element 33 cooperate to hold each other securely together in deformed condition.

An interloper's effort to open the bag and reseal it with the same seal would be directed toward sliding the tape in the sealing clinching portion 33b of the clinching element to loosen the loop 34 sufficiently to enable the device to be slipped off the top of the bag and to be reapplied thereto. Such an attempt would almost certainly involve the insertion of a gradually tapered prying tool between the tape loop 34 and the within bag neck and an effort to pry the tape outwardly so forcibly as to cause it to slide in the portion 33b of the ferrule. Any such effort would not only be opposed by the clinched portions of the ferrule as already explained, but the portion of the ferrule which includes the ribs 35 and teeth 37 (see FIG. 15) would be more forcibly pressed outwardly by the bag, thereby accentuating the bend of the ferrule at point 33z and causing teeth 37 even more firmly to embed themselves in the tape.

Thus, any attempt to pry the seal open serves to render more effective the means in the seal which oppose such opening. If the interloper persists in his efforts, the tape will tear and break either at point 31b (FIG. 11) or at point 33z (FIG. 15), thereby foreclosing reuse of the device.

The second embodiment, illustrated in FIGS. 17-20, differs from the first embodiment chiefly in the provision of a somewhat differently shaped tab 68 in place of tab 48 and, as a more or less direct consequence of that difference, a difference in the manner of disposition of the tape within assembling clinching portion 33a and of clinching and deforming both the latter and the tab 68.

The tab 68 has ears 69 which extend laterally at opposite sides of the tape 31, one end of which has been inserted inwardly into assembling clinching portion 33a, after which the latter portion as well as the tab 68 have been clinched and deformed in the form or manner illustrated in FIGS. 18-20. Ordinarily, transverse ridges in the clinching die serve to give the illustrated clinching of the ferrule portion 33a. However, the transverse ridge portion of the die which forms the V-shaped depression 70 in the tab 68 should be centrally relieved to the extent of about the thickness of the tape so that end areas of the latter ridge portion will engage the ears 69 and the relieved central area of said ridge portion will engage the tape and the underlying tab 68 to provide the complete V-shaped depression 70 in both the tab and its ears as illustrated.

Somewhat similarly to the first embodiment, a tape portion 31c extends across an open V portion of the ferrule to facilitate knife cutting of the tape for authorized opening of the seal and bag. The tab 68 and its ears 69 afford protection to the tape against damage from the knife.

The second embodiment seal is applied to a bag in the same manner as the seal of the first embodiment and the second embodiment provides similar tape-gripping means which oppose slipping of the tape with increasing effect as prying force is applied to open the seal surreptitiously.

Although the seals of both disclosed embodiments lend themselves to economical mechanical production, the second embodiment enjoys some advantages enabling its formation and assembly to be more fully automatic.

It will be realized that flat fabric tape can be mechanically inserted in the seal and thus possesses substantial production advantages over cords which must be rather laboriously inserted by hand.

The present inventive concepts, obviously, may be practiced in ways other than disclosed herein without, however, departing from the invention as set forth in the accompanying claims.

We claim:

1. A bag seal comprising, in its condition prior to use, a length of tape, a deformable sealing element and a deformable tape-gripping element to a first portion of which one end of said tape is fixedly connected, said tape-gripping element having a second portion extending into said sealing element within a space in the latter and adapted, in use of the seal, to receive, also, a distal portion of said tape; and said sealing element and said second portion together being deformable to clinch said distal portion of the tape and adapted, when thus deformed, to coact to hold said distal tape portion securely within said space.

2. A bag seal according to claim 1, said sealing element and said second portion being adapted, when thus deformed, to coact to hold themselves together.

3. A bag seal according to claim 1, said tape being of fabric material.

4. A bag seal comprising, in its condition prior to use, a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted, in use of the seal, to receive a distal portion of said tape therein to form an intervening loop portion of the tape and being further adapted, upon deformation of said sealing element, to become deformed and held within said element and to firmly grip said distal portion of the tape.

5. A bag seal according to claim 4, said sealing clinching portion being formed with a transverse cut-out and having a transverse toothed edge defining a transverse side of said cut-out, and the ferrule element being adapted to bend transversely, in the immediate vicinity of said toothed edge to embed said toothed edge in an adjacent portion of the tape whereby to oppose endwise slippage of the tape in the ferrule.

6. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, said sealing clinching portion being formed with a transverse cut-out and having a transverse toothed edge defining a transverse side of said cut-out, and the ferrule element being adapted to bend transversely, in the immediate vicinity of said toothed edge to embed said toothed edge in an adjacent portion of the tape whereby to oppose endwise slippage of the tape in the ferrule, said ferrule element having a reinforced portion, adjacent to said toothed edge, which reinforced portion, upon tightening of the seal upon a bag neck, is pivoted bodily relatively to said sealing clinching portion to cause the mentioned transverse bending of the ferrule element.

7. A bag seal according to claim 6, said reinforced portion including a strengthening rib extending longitudinally of the ferrule element.

8. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, said assembling clinching and sealing clinching portions being deformable to clinch portions of the tape which are associated therewith and being adapted to retain shapes to which they are deformed, and said ferrule element having a connecting portion, integrally connecting said two clinching portions, and being transversely bendable at said connecting portion when the seal is tightened upon a bag neck.

9. A bag seal according to claim 8, said connecting portion being longitudinally reinforced to oppose intermediate bending thereof and adjoining said two clinching portions at transversely bendable portions of the ferrule element; the latter, at its transversely bendable portion at which said connecting portion adjoins said sealing clinching portion, having a transversely extending toothed edge arranged to embed itself in an adjacent portion of the tape upon bending of the ferrule element at its last-mentioned transversely bendable portion.

10. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, a portion of said ferrule element being of the form of an outwardly facing V, and a portion of said tape, which is adapted to tighten when the seal is sealed upon a bag neck, being positioned across the outer ends of the V to facilitate cutting of the tape thereat to open the seal and the bag.

11. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, said ferrule element having an integral tab at the outer end of said assembling clinching portion, said tape extending from the opposite end of said assembling clinching portion and being reversely bent, and said tab having lateral ears overlying said tape to hold the latter in its said reversely bent condition.

12. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, said assembling clinching portion being deformed to an outwardly opening V shape and a portion of said tape, which is adapted to tighten when the seal is sealed upon a bag neck, being positioned across the open top end of the V-shaped clinching portion to facilitate cutting of the tape to open the seal and the bag.

13. A bag seal according to claim 11, said assembling clinching portion being deformed to an outwardly opening V shape, a portion of said tape extending between opposite ends of the V-shaped clinching portion to facilitate cutting of the tape to open the seal and the bag.

14. A bag seal comprising a length of fabric tape, a deformable sealing element of material of such character as to tenaciously retain a deformed condition, and a sheet metal ferrule element having an assembling clinching portion into which one end portion of said tape is firmly clinched and a sealing clinching portion extending into said sealing element and adapted to receive a distal portion of said tape therein to form an intervening loop portion of the tape and being further adapted, upon deformation of said sealing element, to become deformed and held within said element and to firmly grip said distal portion of the tape, said ferrule element having an integral tab of outwardly opening V shape and a portion of said tape, which is adapted to tighten when the seal is sealed upon a bag neck, being positioned over the open, outer V part of said tab to facilitate cutting of the tape to open the seal and the bag.

15. A bag seal according to claim 14, said tab having opposite, sidewisely extending ears in position to prevent cutting of adjacent bag neck portions by a cutting instrument employed to cut the tape.

16. A bag seal comprising, in its condition prior to use, an elongate tie member, a deformable sealing element and a deformable tie member-gripping element to a first portion of which one end of said tie member is fixedly connected, said tie member-gripping element having a second portion extending into said sealing element within a space in the latter and adapted, in use of the seal, to receive, also, a distal portion of said tie member; and said sealing element and said second portion together being deformable to clinch said distal portion of the tie member and adapted, when thus deformed, to coact to hold said distal tie member portion securely within said space.

17. A bag seal according to claim 16, said second portion having a toothed edge at an extremity thereof remote from said first portion, which toothed edge, upon disposition of said distal portion of the tie member in said second portion, is in intimate engagement with the tie member in position to oppose the latter's removal from said second portion.

18. A bag seal comprising, in its condition prior to use, an elongate tie member, a deformable sealing element of material of such character as to tenaciously retain a deformed condition, and a sheet metal ferrule element having an assembling clinching portion into which one end portion of said tie member is firmly clinched and a sealing clinching portion extending into said sealing element and adapted, in use of the seal, to receive a distal portion of said tie member therein to form an intervening loop portion of the tie member and being further adapted, upon deformation of said sealing element, to become deformed and held within said element and to firmly grip said distal portion of the tie member.

References Cited in the file of this patent

UNITED STATES PATENTS

| | | |
|---|---|---|
| 676,415 | Brooks | June 18, 1901 |
| 2,170,089 | Nelson | Aug. 22, 1939 |
| 2,578,504 | Canter | Dec. 11, 1951 |
| 2,772,909 | Moberg | Dec. 4, 1956 |